United States Patent
Köhler et al.

(10) Patent No.: US 6,844,286 B2
(45) Date of Patent: Jan. 18, 2005

(54) WATER-BASED CATALYST INKS AND THEIR USE FOR MANUFACTURE OF CATALYST-COATED SUBSTRATES

(75) Inventors: Joachim Köhler, Gründau/Haingründau (DE); Volker Bänisch, Erlensee (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 0 days.

(21) Appl. No.: 10/629,442

(22) Filed: Jul. 28, 2003

(65) Prior Publication Data

US 2004/0023104 A1 Feb. 5, 2004

(30) Foreign Application Priority Data

Jul. 31, 2002 (EP) .............................................. 02017239

(51) Int. Cl.[7] ........................ H01M 4/88; H01M 8/10; H01M 4/86; B01J 21/18; B01J 23/40
(52) U.S. Cl. ...................... 502/101; 502/180; 502/182; 502/185; 429/30; 429/33; 429/40; 429/41; 429/42; 429/43; 429/44
(58) Field of Search ........................ 429/30, 33, 40–44; 502/180, 182, 101, 185

(56) References Cited

U.S. PATENT DOCUMENTS

| | | | |
|---|---|---|---|
| 4,229,490 A | 10/1980 | Frank et al. ................. 427/113 |
| 5,211,984 A | 5/1993 | Wilson ........................ 427/115 |
| 5,861,222 A * | 1/1999 | Fischer et al. ................ 429/42 |
| 5,869,416 A | 2/1999 | Mussell ....................... 502/101 |
| 6,127,059 A | 10/2000 | Kato ............................. 429/40 |
| 2001/0024748 A1 * | 9/2001 | Mizuno et al. ................ 429/44 |
| 2002/0034674 A1 * | 3/2002 | Starz et al. ................... 429/40 |
| 2002/0058178 A1 * | 5/2002 | Narayanan et al. ........... 429/42 |
| 2004/0023105 A1 * | 2/2004 | Hohenthanner et al. ...... 429/44 |
| 2004/0142101 A1 * | 7/2004 | Eshraghi et al. ............. 427/115 |

FOREIGN PATENT DOCUMENTS

| | | | |
|---|---|---|---|
| DE | 100 37 074 | 2/2002 | |
| EP | 0 731 416 | 9/1996 | |
| JP | 2004-068018 | * 3/2004 | ........... C09D/11/00 |

* cited by examiner

Primary Examiner—Mark L. Bell
Assistant Examiner—Patricia L. Hailey
(74) Attorney, Agent, or Firm—Kalow & Springut LLP

(57) ABSTRACT

The present invention relates to water-based catalyst inks and their use for manufacture of catalyst-coated substrates. According to the present invention, a catalyst layer is applied to the hydrophobic surface of a substrate by using a water-based catalyst ink comprising an electrocatalyst, an ionomer and water. The catalyst ink also comprises a highly volatile surfactant having a vapor pressure at ambient temperature in the range of 1 to 600 Pa. The use of this surfactant allows applying the water-based ink to the hydrophobic surface of a variety of substrates, such as gas diffusion layers, advanced ionomer membranes and polymer substrates. The required coating deposit can be applied in one coating pass and the resulting catalyst layer exhibits improved performance due to the absence of residual surfactant in the catalyst layer.

11 Claims, 1 Drawing Sheet

US 6,844,286 B2

WATER-BASED CATALYST INKS AND THEIR USE FOR MANUFACTURE OF CATALYST-COATED SUBSTRATES

FIELD OF THE INVENTION

The present invention relates to the field of electrochemical cells and fuel cells, and more specifically to polymer-electrolyte-membrane fuel cells (PEMFC) and direct methanol fuel cells (DMFC).

BACKGROUND OF THE INVENTION

Fuel cells convert a fuel and an oxidizing agent into electricity, heat and water at two spatially separated electrodes. Hydrogen or a hydrogen-rich gas may be used as the fuel and oxygen or air may be used as the oxidizing agent. The energy conversion process in the fuel cell is distinguished by particularly high efficiency. For this reason, fuel cells are gaining increasing importance for mobile, stationary and portable applications.

The polymer electrolyte membrane fuel cell (PEMFC) and the direct methanol fuel cell (DMFC, a variation of the PEMFC, powered directly by methanol instead of hydrogen) are suitable for use as energy converting devices due to their compact design, their power density and high efficiency. The technology of fuel cells is broadly described in the literature, see for example K. Kordesch and G. Simader, "Fuel Cells and its Applications," VCH Verlag Chemie, Weinheim (Germany) 1996.

The basic element of a fuel cell is a membrane-electrode-assembly (MEA). This comprises a membrane consisting of a proton-conducting polymer. This polymer material will be referenced herein as an "ionomer resin," and it may be used to form an ionomer membrane. In a fuel cell, the opposing faces of the electrolyte-membrane are in contact with catalyst layers, which catalyze the electrochemical reactions. One of the catalyst layers forms the anode, and the other catalyst layer forms the cathode of the membrane-electrode-assembly. At the anode, hydrogen is oxidized, and at the cathode, oxygen reacts with the protons that have travelled through the ionomer membrane to yield water and electricity.

A catalyst-coated membrane (hereinafter abbreviated "CCM") comprises a polymer electrolyte membrane that is provided on both sides with a catalytically active layer. One of these layers takes the form of an anode for the oxidation of hydrogen and the second layer takes the form of a cathode for the reduction of oxygen. As the CCM consists of three layers (anode catalyst layer, ionomer membrane and cathode catalyst layer), it is often referred to as a "three-layer MEA."

Gas diffusion layers (GDLs), sometimes referred to as gas diffusion substrates or backings, are placed onto the anode and cathode layers to bring the gaseous reaction media (hydrogen and air) to the catalytically active layers and, at the same time, to establish an electrical contact. GDLs usually consist of carbon-based substrates, such as carbon fiber paper or woven carbon fabric, which are highly porous and provide the reaction gases with good access to the catalyst layers. Furthermore, the gas diffusion layers must be able to supply humidifying water to the anode and to remove reaction water from the cathode, preventing their system of pores from becoming blocked by flooding with water. In order to avoid flooding of the pores of the gas diffusion layers, the GDLs are impregnated with hydrophobic polymers, e.g., with polytetrafluoroethylene (PTFE). GDLs can be tailored specifically into anode-type GDLs or cathode-type GDLs, depending on into which side they are built in a MEA.

The carbon substrates from which the GDLs are manufactured exhibit a quite coarse surface. Therefore, in order to improve the contact of the GDLs to the catalyst layers of the fuel cell, the GDLs can be coated with a microlayer. The microlayer usually consists of a mixture of electrically conductive carbon black and a hydrophobic polymer, e.g., polytetrafluoroethylene (PTFE) and smoothes the coarse surface structure of the carbon substrates.

As described above, a membrane-electrode-assembly consists of five layers: a central polymer electrolyte membrane, two catalyst layers and two gas diffusion layers. The polymer electrolyte membrane consists of proton-conducting polymer materials. These materials form the ionomer membranes. Tetrafluoroethylene-fluorovinyl-ether copolymer with sulfonic acid groups is preferably used. This material is marketed by, for example, E. I. DuPont under the trade name Nafion®. However, other, especially fluorine-free, ionomer materials such as sulfonated polyether ketones or aryl ketones or polybenzimidazoles may also be used. Suitable ionomer materials are described by O. Savadogo in "Journal of New Materials for Electrochemical Systems" I, 47–66 (1998). For use in fuel cells, these membranes generally have a thickness of between 10 and 200 $\mu$m. Additionally, the surface of polymer electrolyte membranes is typically hydrophilic; however, advanced materials with hydrophobic surfaces are also known.

The anode and cathode catalyst layers contain electrocatalysts, which catalyze the respective reaction (oxidation of hydrogen at the anode and reduction of oxygen at the cathode). Preferably, the metals of the platinum group of the periodic table are used as the catalytically active components. For the most part, supported catalysts are used in which the catalytically active platinum group metals have been fixed in nano-sized particle form to the surface of a conductive support material. The average particle size of the platinum group metal is between about 1 and 10 nm. Carbon blacks with particle sizes of 10 to 100 nm and high electrical conductivity have proven to be suitable as support materials.

Various ways of manufacturing a complete membrane-electrode-assembly (MEA) have been disclosed. For example, the electrolyte membrane can first be coated on both sides with the requisite catalyst layers yielding a catalyst-coated membrane (CCM). To produce a membrane electrode assembly therefrom, GDLs need to be placed on top of the catalyst layers and laminated thereto. Alternatively, the catalyst layers can be coated first onto the gas diffusion layers to yield catalyst coated backings (CCBs). An electrolyte membrane is then placed between two catalyst coated backings and a firm contact between all three components is established by applying heat and pressure.

Thus, a MEA can be manufactured by combining a CCM (catalyst-coated membrane) with two GDLs (on the anode and the cathode side), or alternatively, by combining an ionomer membrane with two catalyst-coated backings (CCBs) at the anode and the cathode sides. In both cases, a five-layer MEA product is obtained. These two manufacturing schemes may be combined, if suitable.

In order to produce a CCB, one may use a catalyst ink. A catalyst ink is a pasty substance comprising an electrocatalyst, an ionomer, solvents and optionally other ingredients, e.g., hydrophobic polymer binders, pore-forming agents, etc. This ink is then applied using a suitable technique to the surface of the gas diffusion layer and cured by heating. The thus prepared catalyst-coated backings (CCBs) can be combined with an ionomer membrane to form a membrane-electrode-assembly.

The solvents used for preparing the ink usually comprise water and organic solvents. Depending on the amount of water, one can distinguish water-based inks, wherein water forms the major part of the solvents used, from inks wherein organic solvents form the major part.

The use of catalyst inks is well known to persons skilled in the art. For example, U.S. Pat. No. 5,869,416 discloses catalyst inks that are based predominantly on organic solvents such as propylene carbonate, ethylene carbamate and the like. However, water-based inks are mostly preferred because they are not subject to stringent occupational safety and health standards.

In U.S. Pat. No. 4,229,490, a method for catalyst application to an electrode substrate is proposed, using a catalyst ink that contains Pt black, graphite, PTFE, water and Triton-X as a surfactant. Due to the high boiling point and low vapor pressure of the Triton-X, separate washing and rinsing steps need to be applied in order to remove the surfactant after printing and drying.

U.S. Pat. No. 5,211,984 describes catalyst layers prepared using polyvinyl alcohol (PVA). The surfactant nature of the PVA provides for adequate dispersion among the supported catalyst particles in an aqueous solution and the molecular structure acts to bind the carbon particles and Nafion® agglomerates so that strong films are obtained with low weight fractions of PVA. Unfortunately, PVA is a polymer material that must be decomposed by heat or washed by water to remove it from the catalyst layer.

U.S. Pat. No. 6,127,059 describes the use of Triton-X 100 surfactant for preparing an ink comprising carbon black and polytetrafluoroethylene (PTFE). This ink is used to coat a carbon cloth substrate. Thereafter, the cloth is dried and heated for 30 minutes at 370° C. to melt the PTFE and, at the same time, to decompose and to remove the surfactant.

European Patent Application Serial No. 0 731 520 A1 describes a catalyst ink comprising an electrocatalyst, ionomer and water as a solvent. Apart from the ionomer, the ink comprises no further organic components. German Patent Application Serial No. DE 100 37 074 A1 discloses a catalyst ink comprising an electrocatalyst, an ionomer, water and an organic solvent wherein the organic solvent is at least one compound selected from linear di-alcohols with a flashpoint above 100° C. that are present in the ink in an amount ranging from 1 to 50 wt. % relative to the weight of the water.

When trying to coat hydrophobic substrates, such as, e.g., backings or polymer films, with hydrophilic water-based inks, a severe wetting problem arises especially when the coating needs to be applied in a large format. The printed ink tends to accumulate and forms islands so that several consecutive coating passes are necessary to achieve a uniform coating. This is both time-consuming and costly.

Based on the foregoing, there is a need in the art for a means for coating hydrophobic backings and other substrates with water-based inks without the aforementioned wetting problems just described. Therefore, the present invention is directed to a process for manufacturing catalyst-coated substrates with a water-based catalyst ink without the necessity to apply several coating passes in order to overcome the water repellent property of the hydrophobic surface of the substrate. The present invention is also directed to providing suitable catalyst inks for this process.

For a better understanding of the present invention together with other and further advantages and embodiments, reference is made to the following description taken in conjunction with the examples, the scope of which is set forth in the appended claims.

SUMMARY OF THE INVENTION

The present invention is directed to water-based catalyst inks that may be used to manufacture catalyst coated substrates for membrane fuel cells, such as CCBs, CCMs and the like. According to the present invention, a catalyst ink is made by adding a surfactant to the water-based catalyst ink. Highly volatile surfactants having a vapor pressure at ambient temperature (approx. 20–25° C.) of from 1 to 600 Pa are suitable for this purpose. The use of such a surfactant allows the application of the water-based ink to the hydrophobic surface of a substrate.

The required coating deposit ("lay-down") can be achieved in a single coating pass, and the resulting catalyst layer exhibits no reduction in performance due to residual surfactant in the layer. At the drying temperatures used during the coating process, the surfactant evaporates from the ink without any residue in the catalyst layer.

According to one embodiment, the present invention provides a water-based catalyst ink comprising:

(a) an electrocatalyst in an amount of 5 to 75 wt. % based on the weight of the ink;

(b) an ionomer solution in an amount of 10 to 75 wt. % based on the weight of the ink;

(c) water in an amount of 10 to 75 wt. % based on the weight of the ink;

(d) an organic solvent in an amount of 0 to 50 wt. % based on the weight of the ink; and (e) a surfactant with a vapor pressure at ambient temperature in the range of 1 to 600 Pascal, in an amount of 0.1 to 20 wt. % based on the weight of the ink.

According to a second embodiment, the present invention provides a process for manufacturing a catalyst-coated substrate that comprises a hydrophobic surface and deposited thereon a catalyst layer, said process comprises the steps of:

(a) providing a substrate with a hydrophobic surface;

(b) coating the hydrophobic surface of the substrate with a catalyst ink, wherein said catalyst ink is comprised of an electrocatalyst, an ionomer, a solvent and a surfactant; and (c) drying the resultant catalyst-coated substrate;

wherein the surfactant is highly volatile, having a vapor pressure at ambient temperature in the range of 1 to 600 Pa.

According to a third embodiment, the present invention provides a process for manufacturing a gas diffusion electrode that comprises a hydrophobic gas diffusion layer and deposited thereon a catalyst layer, said process comprises coating a hydrophobic phosphate gas diffusion layer with a catalyst ink, wherein said ink is comprised of an electrocatalyst, an ionomer, a solvent and a surfactant, wherein the surfactant is highly volatile, having a vapor pressure at ambient temperature in the range of 1 to 600 Pa, and drying the resultant gas diffusion electrode.

Optionally, the present invention can be used in connection with application techniques that use a coating step followed by a leveling step and a drying step as described in commonly owned European Patent Application Serial No. 02017238.3.

DETAILED DESCRIPTION OF THE INVENTION

Figure 1:
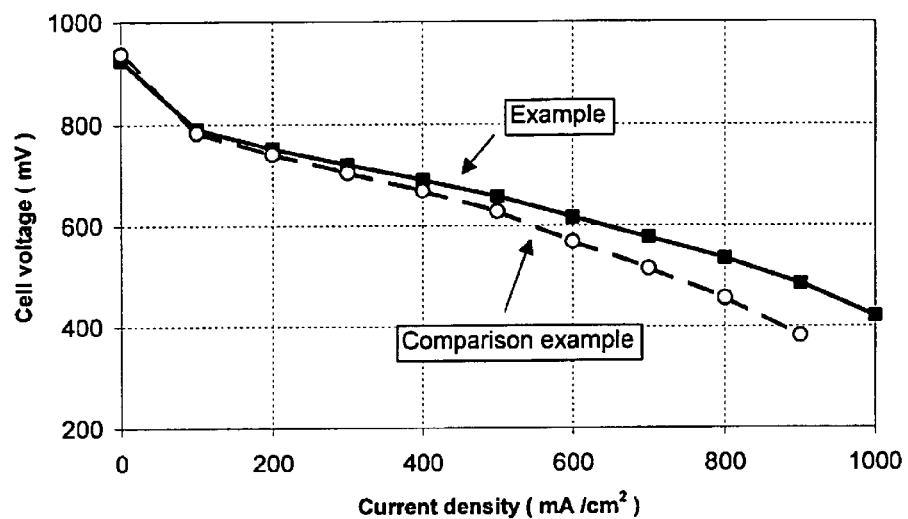
FIG. 1 shows the U/I performance curves (cell voltage vs. current density) for a MEA manufactured by using the catalyst ink according to the present invention (example 1) compared to a MEA made by using a conventional catalyst ink (comparative example).

The present invention is directed to a water-based ink containing a surfactant. The surfactant improves the wetting characteristic of the ink, particularly to hydrophobic substrate materials, such as polymer films, advanced ionomer membrane materials or PTFE-impregnated backings.

The present invention will now be described in connection with preferred embodiments. The embodiments are presented to aid in an understanding of the present invention and are not intended to, and should not be construed to, limit the invention in any way. All alternatives, modifications and equivalents that may become obvious to those of ordinary skill in the art upon reading the disclosure are included within the spirit and scope of the present invention.

The present invention is not intended to be treatise on catalyst inks or membrane electrode assemblies. Readers are referred to appropriate texts on those subjects for additional information as necessary.

The present invention provides water-based inks containing a selected type of surfactant. This surfactant improves the wetting characteristics of the ink, particularly to hydrophobic substrate materials, such as, e.g., polymer films, advanced ionomer membrane materials or PTFE-impregnated backings.

The present invention is directed to a catalyst ink that comprises a surfactant that has a relatively high vapor pressure. This vapor pressure facilitates the removal of the surfactant during the drying stage, which preferably occurs at temperatures from 50 to 150° C. As a consequence, less surfactant is remaining in the printed electrode layers. This in turn leads to an improvement in electrical performance of the MEAs manufactured with these inks. By contrast, a surfactant with a very low vapor pressure (i.e. below 1 Pa), for example, octyl-phenoxy-polyethoxylates such as Triton X-100, manufactured by Rohm & Haas Co., would remain in the printed electrode after the drying process and deactivate the catalyst layer.

Surfactants that are suitable for use with the present invention preferably have vapor pressures in the range of 1 to 600 Pa, more preferably in the range of 100 to 500 Pa and most preferably between 200 and 400 Pa at ambient temperatures (approximately 20–25° C.). Examples of suitable classes of surfactants include but are not limited to non-ionic, anionic or cationic surfactants, such as fluorinated wetting agents (Fluorad types, manufactured by 3M Co.), tetramethyl-decyn-diol based wetting agents (Surfynol® types, manufactured by Air Products and Chemicals Inc.), soya-lecithin based wetting agents or phospho-amino-lipoides and the like, as well as mixtures thereof. The vapor pressure of the materials can be determined by standard techniques. Lists of such data are also available e.g. in "CRC Handbook of Chemistry and Physics," CRC Press LLC, Boca Raton (USA).

In addition to the surfactant, the catalyst ink comprises an electrocatalyst, an ionomer resin and water, preferably deionized water, as the main solvent. The amount of surfactant added is in the range of 0.1 to 20 wt. % based on the total composition of the catalyst ink, and preferably 0.1 to 10 wt. %. In addition to the surfactant, the water-based ink may contain additional organic solvents, additives, defoamers, pore forming agents, preservatives, and the like.

Electrocatalysts that are suitable for use with the present invention include but are not limited to carbon black supported precious metal based catalysts such as Pt/C or PtRu/C. However, precious metal powders and precious metal blacks, as well as inorganic oxides containing precious or non-precious metals can be used.

A preferred embodiment of the present invention is directed to a water-based catalyst ink that comprises 5 to 75 wt. % of an electrocatalyst, 10 to 75 wt. % of an ionomer solution (water-based or organic solvent based), 10 to 75 wt. % of deionized water, 0 to 50 wt. % of organic solvents and 0.1 to 20 wt. % of surfactant with a vapor pressure of 1 to 600 Pa. Suitable organic solvents include but are not limited to glycols, (e.g., ethylene glycol, diethylene glycol, propylene glycol, dipropylene glycol, butanediol and mixtures thereof) alcohols, (e.g., $C_{1-4}$ alcohols and mixtures thereof) esters, (e.g., esters of $C_{1-4}$ alcohol with a $C_{1-4}$ carboxylic acid and mixtures thereof) aromatic solvents, (e.g., benzene or toluene) and aprotic dipolar solvents (e.g., N-methylpyrrolidone, ethylene carbonate, propylene carbonate, DMSO and the like), as well as mixtures of these substances. Preferably, glycols are employed.

The ionomer solutions are commercially available and typically comprise an ionomer in water or an organic solvent. Generally, they contain 5 to 20% ionomer. Depending on the type of electrocatalyst, the weight ratio of ionomer to electrocatalyst is usually from 1:1 to 1:15, preferably from 1:1 to 1:10 and more preferably 1:2 to 1:6. The ionomer solution is diluted with water and optionally additional organic solvent to ensure that the resultant ink can be processed.

The present invention also provides a process directed to manufacturing a catalyst-coated substrate that comprises the following steps:

(a) providing a substrate with a hydrophobic surface (GDL, ionomer membrane, etc.);

(b) providing a water-based catalyst ink comprised of an electrocatalyst, an ionomer, a solvent and a surfactant; and (c) coating the hydrophobic surface of the substrate with said ink and drying the resulting catalyst-coated substrate;

wherein the surfactant is highly volatile and has a vapor pressure at ambient temperatures of from 1 to 600 Pa.

The substrate is preferably selected from the group consisting of polymer film, an ionomer membrane, a carbon fiber, a carbon cloth, a carbon felt or a paper-type material. The substrate can be present as an individual sheet or in continuous roll form.

In one sub-embodiment, the hydrophobic surface may be coated with a microlayer and then dried and calcined, prior to applying a catalyst layer. Preferably the calcining takes places at a temperature between 200 and 400° C. The microlayers may for example consist of a mixture of electrically conductive carbon black and a hydrophobic polymer, e.g., polytetrafluoroethylene (PTFE) and smooth the coarse surface structure of the carbon substrates.

Having now generally described the invention, the same may be more readily understood through reference to the following examples, which are provided by way of illustration and are not intended to limit the present invention unless specified.

EXAMPLE

For manufacturing a membrane-electrode-assembly (MEA) according to the proposed process, water-based catalyst inks were prepared using Surfynol® from Air Products and Chemicals Co. as a surfactant. Surfynol® 420 has a vapor pressure at ambient temperature (22° C.) of approximately 270 Pa. As a source for the ionomer in the catalyst ink, a Nafion® solution in water was used. The ionomer was employed in its acidic form. The following inks were prepared for the cathode and anode:

Catalyst ink for the cathode:

| | |
|---|---|
| 13.0 g | Electrocatalyst Elyst A 40 (40% Pt/C, OMG AG, Hanau) |
| 50.0 g | Nafion ®-Solution (11.4 wt.-% in water) |
| 35.0 g | water (deionized) |
| 2.0 g | Surfynol ® 420 |
| 100.0 g | |

Catalyst ink for the anode:

| | |
|---|---|
| 14.0 g | PtRu-Electrocatalyst (40% PtRu/C, OMG AG, Hanau) |
| 48.0 g | Nafion ®-Solution (11.4 wt.-% in water) |
| 36.0 g | water (deionized) |
| 2.0 g | Surfynol ® 420 |
| 100.0 g | |

The catalyst ink for the cathode was prepared by thoroughly mixing the catalyst with the Nafion® solution, water and surfactant by means of a high speed stirring device. This ink was coated onto a hydrophobic carbon fiber paper (HE-paper from SGL-Carbon) by screen printing in only one pass and dried in two steps: at 75° C. for 3 minutes and at 95° C. for 1 minute. The whole surface of the gas diffusion layer was evenly coated with the catalyst layer. The resulting cathode gas diffusion electrode (GDE) had a precious metal loading of 0.4 mg Pt/cm$^2$. In the same manner, the anode gas diffusion electrode was manufactured by using the catalyst ink for the anode. The anode GDE had a precious metal loading of 0.3 mg Pt/cm$^2$ and 0.15 Ru/cm$^2$. As with the cathode GDE, only one coating pass was necessary to achieve an even coating over the whole surface of the carbon fiber substrate without island formation.

The thus produced cathode and anode GDEs were used to build up a MEA (membrane electrode assembly). For that purpose an uncoated ionomer membrane (Nafion® 112; DuPont; thickness of membrane 50 µm) was placed between the anode and cathode GDEs. This assembly was then laminated under a pressure of 20 bar for the duration of 1 minute at a temperature of 150° C.

Comparison Example

For comparison, the catalyst inks were prepared in the same way as described in the example above. However, instead of Surfynol®, Triton X-100 was used as surfactant, which is widely used in fuel cell industry. This surfactant has a vapor pressure of less than 1 Pa at ambient temperature (22° C.). Thus, this surfactant is much less volatile than Surfynol®. With the two water-based catalyst inks, a membrane-electrode-assembly was prepared in the same way as described in the preceding example.

Electrochemical Tests:

The membrane-electrode-assemblies from the example and the comparison example were inserted into a PEMFC single test cell with an active area of 50 cm$^2$ and their electrochemical performances were measured by using reformate as fuel gas for the anode and air for the oxidant at the cathode. The anode gas mixture contained 45 vol. % $H_2$, 31 vol. % $N_2$, 21 vol. % $CO_2$ and 50 vol. ppm CO with an additional air bleed of 3 vol. %. The cathode of the test cell was supplied with air. The cell temperature was adjusted to 70° C. Humidification of the anode was done at 80° C. and of the cathode at 55° C. The operating gas pressure was set to 1 bar (absolute). The stoichiometry of the reactants were adjusted to 1.1 for the anode gas and 2.0 for the cathode gas.

The measured cell voltages for selected current densities are listed in Table 1 and shown in FIG. 1. These results clearly demonstrate that the MEA manufactured by using the catalyst ink according to the invention has a considerably improved electrochemical performance across the full current density range. As the figure demonstrates, when the cell voltage of the example is compared to the comparison examples, as the current density increases so too does the difference in cell voltages.

The surfactants Surfynol® 420 and Triton X-100 have different vapor pressures at ambient temperature. The vapor pressure of Surfynol® is significantly higher than that of Triton X-100. Therefore, Surfynol® evaporates easily from the catalyst ink at the drying conditions applied. The remaining catalyst layer is substantially free of surfactant and consequently has a very good electrochemical performance. In contrast, Triton X-100 evaporates only slowly from the catalyst ink so that the dried catalyst layer still contains considerable amounts of the surfactant, which is assumed to partially block the active sites of the electrocatalyst and thus leads to a poorer performance.

TABLE 1

Measured cell voltages (mV) for selected current densities of the membrane electrode assemblies from the example and from the comparison example.

| | Current density [mA/cm$^2$] | | |
|---|---|---|---|
| | 100 | 500 | 900 |
| Example [mV] | 791 | 658 | 484 |
| Comparison example [mV] | 784 | 627 | 381 |

What is claimed is:

1. A water-based catalyst ink comprising:
   (a) an electrocatalyst in an amount of 5 to 75 wt. % based on the weight of the ink;
   (b) an ionomer solution in an amount of 10 to 75 wt. % based on the weight of the ink;
   (c) water in an amount of 10 to 75 wt. % based on the weight of the ink;
   (d) an organic solvent in an amount of 0 to 50 wt. % based on the weight of the ink; and
   (e) a surfactant with a vapor pressure at ambient temperature in the range of 1 to 600 Pascal, in an amount of 0.1 to 20 wt. % based on the weight of the ink.

2. A water-based catalyst ink according to claim 1, wherein the vapor pressure of the surfactant at ambient temperature is between 100 and 500 Pa.

3. A water-based catalyst ink according to claim 2, wherein the surfactant is selected from the group consisting of fluorinated wetting agents, tetramethyldecyn-diol based wetting agents, soya-lecithin based wetting agents, phosphoamino-lipoides and mixtures thereof.

4. A water-based ink according to claim 3, wherein the concentration of the surfactant is between 0.1 to 10 wt. % relative to the total weight of the catalyst ink.

5. A process for manufacturing a catalyst-coated substrate that comprises a hydrophobic surface and deposited thereon a catalyst layer, said process comprises the steps of:
   (a) providing a substrate with a hydrophobic surface;

(b) coating said hydrophobic surface of the substrate with a catalyst ink, wherein said catalyst ink is comprised of an electrocatalyst, an ionomer, a solvent and a surfactant; and (c) drying the resultant catalyst-coated substrate;

wherein the surfactant has a vapor pressure at ambient temperature in the range of 1 to 600 Pa.

6. The process according to claim 5, wherein the surfactant of the water-based catalyst ink is removed at a drying temperature in the range of 50 to 150° C.

7. A method of using the catalyst-coated substrate manufactured according to claim 5, said method comprising incorporating said catalyst-coated substrate into a membrane-electrode-assembly.

8. A process for manufacturing a gas diffusion electrode that comprises a hydrophobic gas diffusion layer and deposited thereon a catalyst layer, said process comprises the step of:

(a) applying a catalyst ink to a gas diffusion electrode, wherein said catalyst ink is comprised of an electrocatalyst, an ionomer, a solvent and a surfactant, wherein the surfactant has a vapor pressure at ambient temperature in the range of 1 to 600 Pa; and (b) drying the gas diffusion electrode.

9. The process according to claim 8, wherein prior to applying the catalyst layer, the gas diffusion electrode is first coated with a microlayer and then dried and calcined.

10. The process according to claim 9, wherein the gas diffusion electrode is calcined at a temperature between 200 and 400° C.

11. A method of using of the gas diffusion electrode layer manufactured according to claim 8, said method comprising incorporating said gas diffusion electrode into a membrane-electrode-assembly.

* * * * *